United States Patent [19]

Evans

[11] Patent Number: 5,033,760
[45] Date of Patent: Jul. 23, 1991

[54] METHOD OF CONVERTING A WHEEL BARROW FROM A SINGLE TO A DUAL WHEEL

[76] Inventor: Anthony C. Evans, 55400 W. Eight Mile Rd., Northville, Mich. 48167

[21] Appl. No.: 463,598

[22] Filed: Jan. 11, 1990

[51] Int. Cl.$^5$ ............................................... B62B 1/20
[52] U.S. Cl. .................................. 280/47.26; 280/47.31
[58] Field of Search .................. 280/653, 47.26, 47.31, 280/652, 654, 47.3, 47.32; 301/7

[56] References Cited

U.S. PATENT DOCUMENTS

| 241,148 | 5/1881 | Marsh | 280/47.31 X |
| 385,381 | 7/1888 | Spalding | 280/47.31 X |
| 2,250,797 | 7/1941 | Garlinghouse | 280/47.31 X |

FOREIGN PATENT DOCUMENTS

| 3644178 | 7/1988 | Fed. Rep. of Germany | 280/47.31 |
| 745875 | 2/1933 | France | 280/47.31 |
| 929138 | 12/1947 | France | 280/47.31 |
| 112721 | 2/1924 | Switzerland | 280/47.31 |
| 1191347 | 11/1985 | U.S.S.R. | 280/47.31 |
| 2206317 | 1/1989 | United Kingdom | 280/653 |

*Primary Examiner*—Andres Kashnikow
*Assistant Examiner*—Michael Mar
*Attorney, Agent, or Firm*—Ralph J. Skinkiss

[57] ABSTRACT

A method of converting a single wheel wheel barrow to a dual wheel wheel barrow is taught whereby an extended axle is attached to the structural longerons by rotating the axle attaching brackets rearwardly upon each associated longeron and affixing a wheel laterally outside each longeron.

1 Claim, 4 Drawing Sheets

METHOD OF CONVERTING A WHEEL BARROW FROM A SINGLE TO A DUAL WHEEL

BACKGROUND OF THE INVENTION

My invention generally relates to a manually operated material handling vehicle commonly used on construction sites referred to as a wheel barrow.

The common wheel barrow generally consists of a material containing bucket mounted upon an A frame structure comprising two diverging longerons serving to support the bucket and provide handles by which the vehicle is operated A single wheel is mounted in the general vicinity of the A frame apex to provide mobility. Although simple in design the common wheel barrow requires much skill and dexterity to operate. For example, if the center of gravity of the load placed within the bucket is not directly on the longitudinal center line of the vehicle, which is generally the situation, a lateral rolling moment about the wheel-ground contact point is present. Thus when the operator grasps the handles and lifts the end of the vehicle, the vehicle exhibits lateral instability, or roll, about the longitudinal axis.

To stabilize the vehicle the operator must exert unequal forces on the handles. The amount of lifting force necessary to stabilize the vehicle is unknown until the operator first lifts the handles; trial and error then becomes necessary to stabilize the vehicle. During forward movement of the vehicle over an uneven surface the forces transmitted to the single wheel constantly vary thereby requiring constant adjustment, by the operator, of the unequal lifting forces applied to the handles. Because of the off center, center of gravity the stability of the vehicle is further complicated by the necessity of applying unequal forward thrust forces to the handles to propel the vehicle forward. Thus in operation of the single wheel, wheel barrow the operator must constantly vary the lift and thrust forces to each of the two handles. It is not uncommon to have a novice wheel barrow operator having a wheel barrow heavily loaded, with a greatly off center, center of gravity, operating over a rough surface to inadvertently dump the load.

BRIEF SUMMARY OF THE INVENTION

In the present invention the lateral instability of the common wheel barrow is eliminated thereby increasing the positive control and safety to the operator during operation of the vehicle by providing two wheels laterally displaced from the vehicles longitudinal center line and external to the A frame longerons.

DETAILED DESCRIPTION OF THE INVENTION

Figure 1:
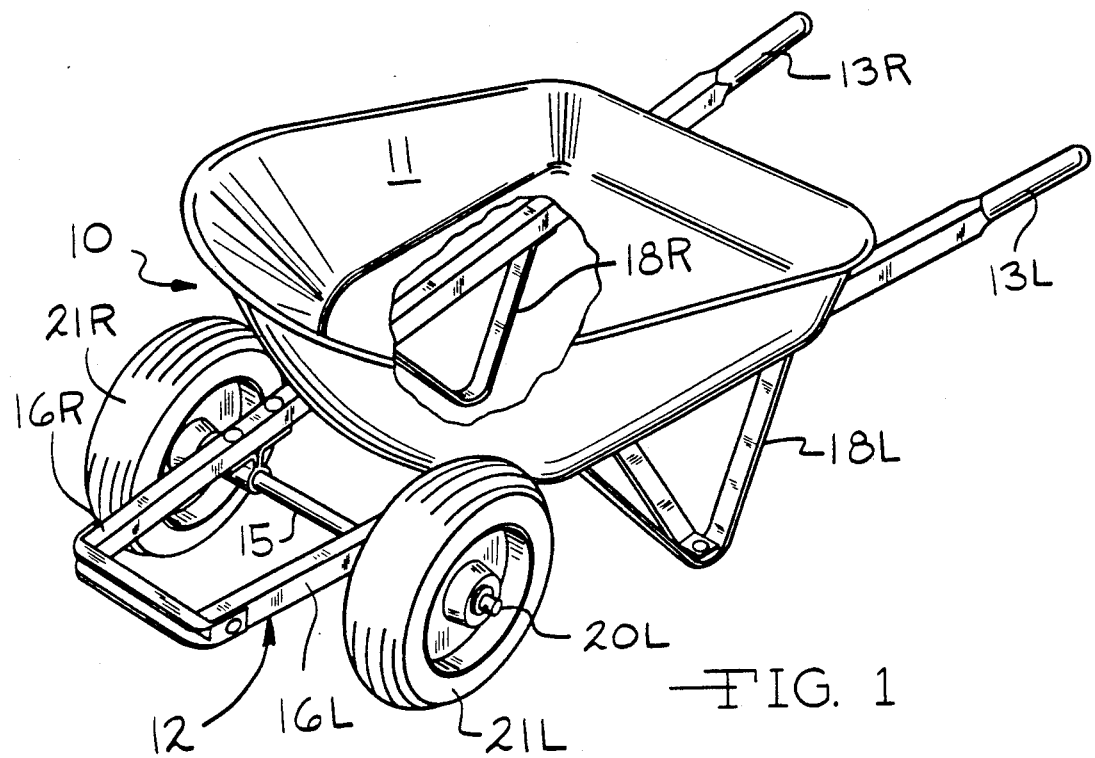
FIG. 1 is a perspective view of a wheel barrow vehicle embodying my invention.
Figure 2:
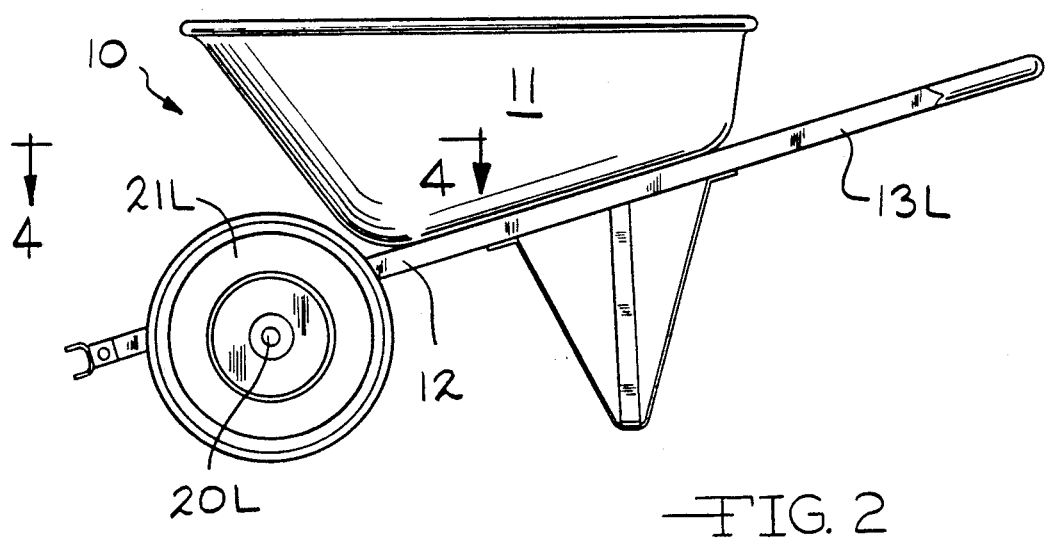
FIG. 2 is a left side elevation view of the wheel barrow shown in FIG. 1.
Figure 3:
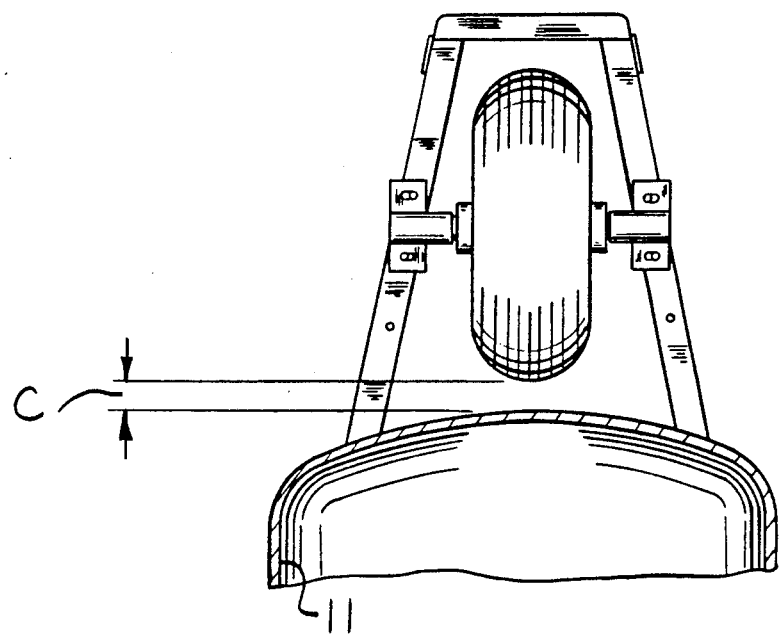
FIG. 3 is a sectional plan view, similar to that shown in FIG. 4, of a prior art single wheel, wheel barrow.
Figure 4:
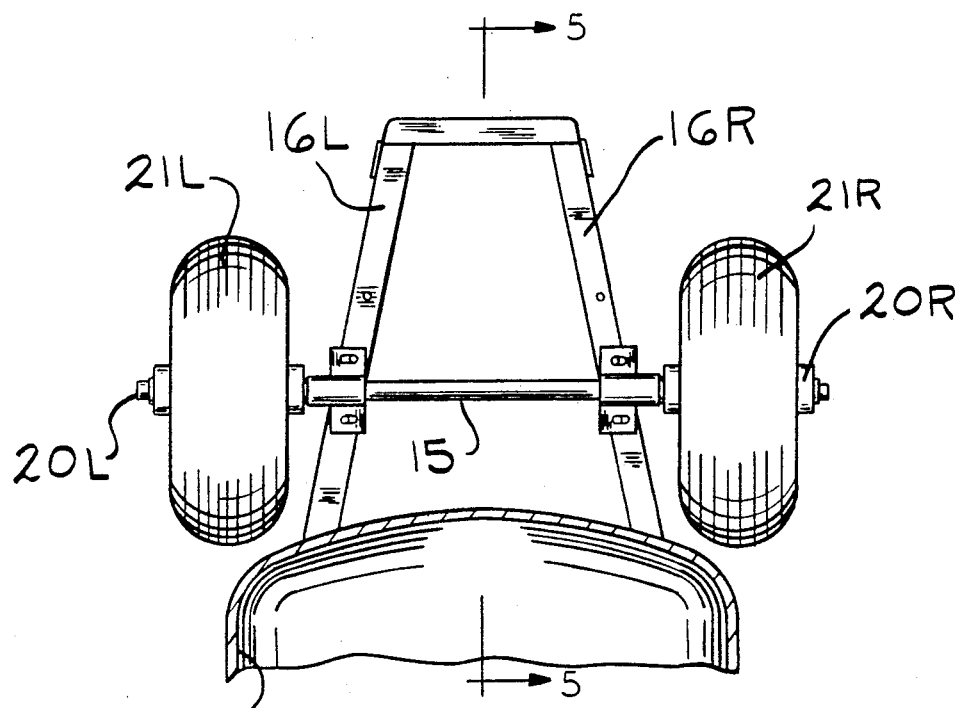
FIG. 4 is a sectional plan view generally taken along line 4—4 in FIG. 2.

Referring now to FIGS. 1, 2 and 4, a wheel barrow 10 is shown having a stamped steel or compression molded fiber reinforced plastic bucket 11 mounted upon an A frame structure 12 generally comprising two diverging longerons 16L and 16R. The longerons 16L and 16R terminate at the operator end of the vehicle as handles 13L and 13R. In the preferred embodiment axle 15 extends laterally across and beyond longerons 16L and 16R providing stub axles 20L and 20R upon which wheels 21L and 21R are rotatingly attached. Typical support legs 18L and 18R are affixed to each longeron forward of the support handles 13L and 13R thus providing a four point support system comprising support legs 18L and 18R and wheels 21L and 21R thereby providing a more stable vehicle, in the static position, than the prior art single wheel, wheel barrow as structurally shown in FIG. 3.

Figure 5:
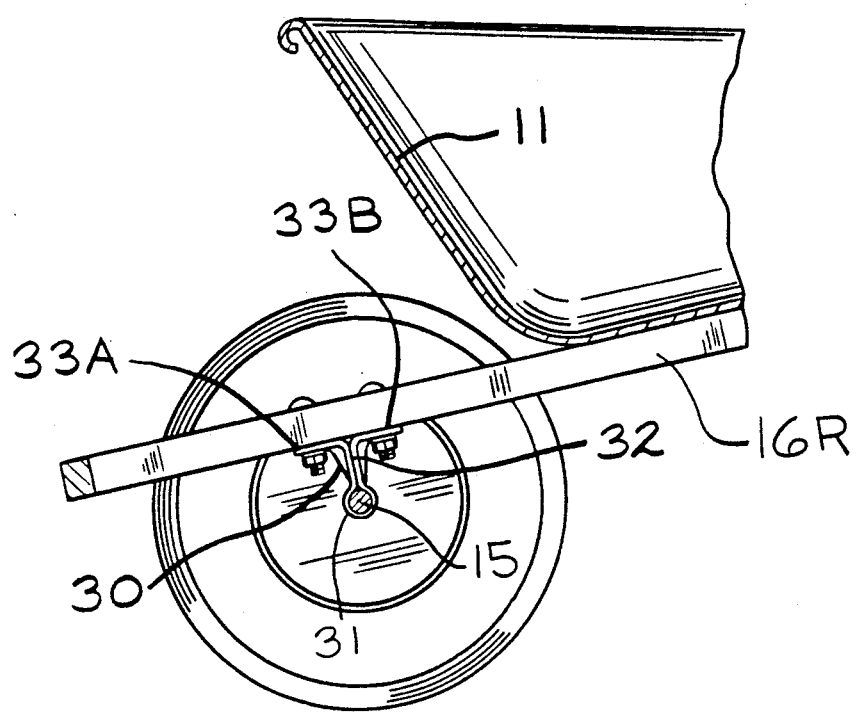
FIG. 5 is an elevational section taken generally along line 5—5 in FIG. 4 showing a typical axle attachment apparatus.

FIG. 5 shows a typical axle mounting bracket 30 that may be used to attach axle 15 to longerons 16L and 16R wherein the bracket is formed from a single flat sheet of steel forming an internal diameter opening 31 sufficient for receipt of axle 15 therein and forming a post 32 extending radially away from the axle opening terminating in two oppositely extending flanges 33A and 33B. Although this type of axle mounting bracket may be acceptable for light loads it may not be structurally sound for vehicles intended to carry very heavy loads such as fresh mixed concrete.

Figure 6:
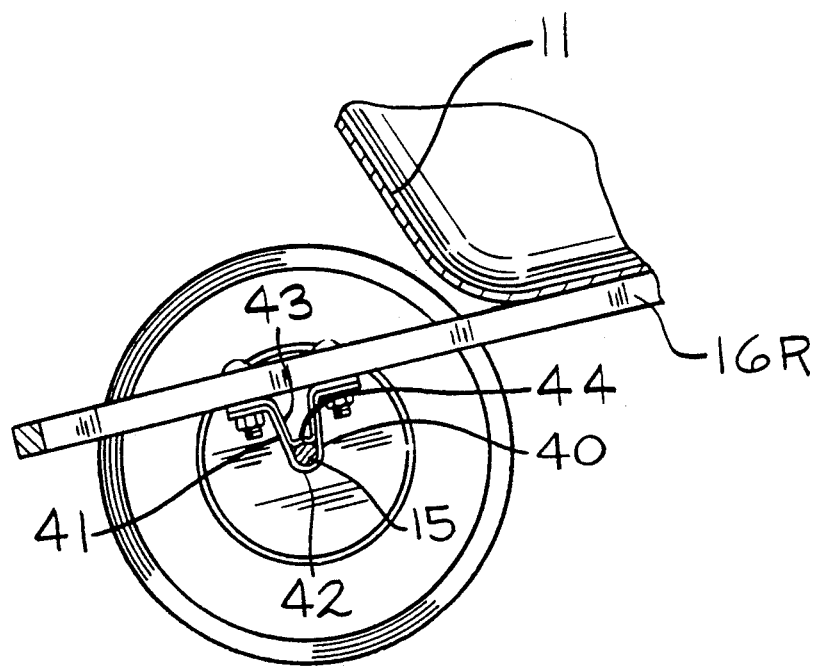
FIG. 6 is a sectional elevation similar to FIG. 5 showing an alternate axle attachment apparatus.

FIG. 6 shows an A shaped axle mounting bracket 40 more suitable for vehicles intended for heavier loads. Bracket 40 generally comprises an A shaped member 41 having an internal apex diameter 42 suitable to receive axle 15 therein. A matched pillow block bracket 43 is received within A shaped member 41 having a suitably configured end 44 for receipt therein of axle 15 such that axle 15 is constrained between member 41 and pillow block 43 for transfer of forces from axle 15 through mounting bracket 40 to the appropriate vehicle longeron.

Figure 7:
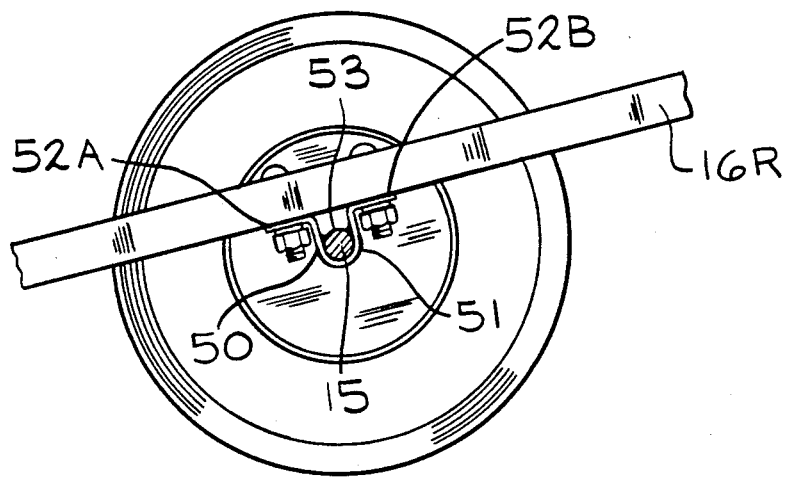
FIG. 7 is a sectional elevation similar to FIG. 5 showing a second alternate axle attachment apparatus.

FIG. 7 shows an additional alternate embodiment of a mounting bracket 50 generally comprising a metal strap having a "U" shaped portion 51 shaped to receive therein axle 15 and further shaped to provide mounting flanges 52A and 52B which are affixed to each longeron by any convent fastener. Pillow block 53 is provided to act as a bearing surface between axle 15 and the associated longeron. Alternatively pillow block 53 may be eliminated whereby axle 15 is permitted to bear directly upon the longeron.

Figure 8:
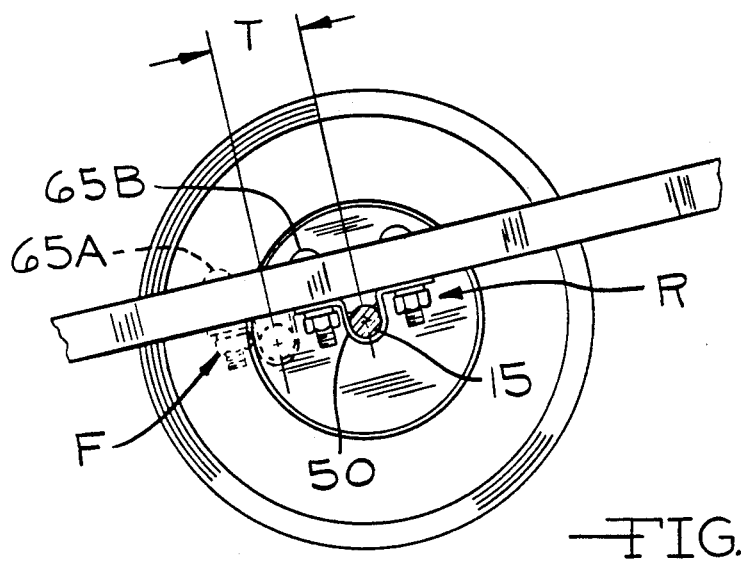
FIG. 8 is a sectional elevation similar to FIG. 7 showing a typical method of converting a single wheel, wheel barrow to a dual wheel, wheel barrow according my invention.

The mounting bracket as shown in FIGS. 5, 6, and 7 represent typical apparatus for attaching axles to wheel barrow longerons. With these types of mounting brackets it is relatively simple to convert an existing prior art wheel barrow having a single wheel to one having my improved dual wheel system. As shown in FIG. 8 the forward fastener 65A may be readily removed, rear fastener 65B loosened and bracket 50 rotated 180 degrees from position F to position R. Upon replacing fastener 65A in its new rearwardly location, axle shaft 15 has been translated rearward by the distance T.

Figure 9:
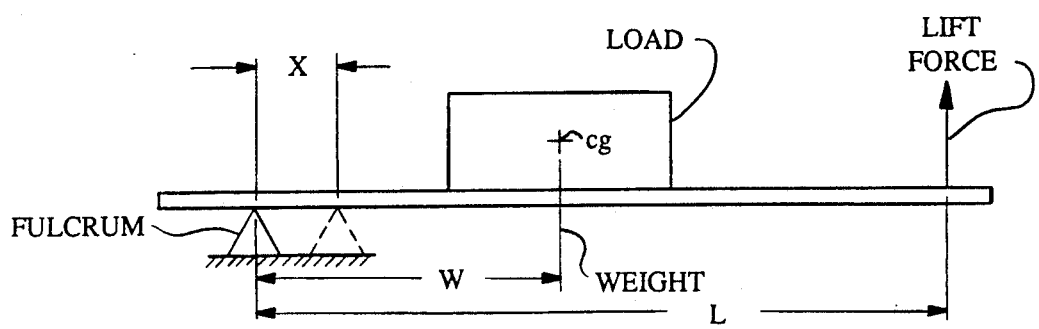
FIG. 9 is a schematic illustration of the simple mechanical lever represented by the typical wheel barrow.

Referring to FIG. 9, showing the free body diagram of a wheel barrow as representing a simple lever having the fulcrum positioned at one end thereof, the lifting force applied at the opposite end and the load therebetween. The mechanical advantage, L/W may be increased by reduction of the distance W between the wheel's axle (the fulcrum) and the load center of gravity cg by the amount X. Although both L and W are reduced by X, X nevertheless represents a much larger proportion of W than of L. Therefore, the ratio L/W will increase. Thus by converting a prior art wheel barrow in accord with my invention not only is the lateral stability of the vehicle improved, but the mechanical advantage of the vehicles is also increased.

The mechanical advantage of the wheel barrow can be further increased by moving the axle further rearward. The limit of rearward movement of axle 15 is only restricted by the overall diameter of the wheels and the configuration of the bucket. It can be seen from FIGS. 3 and 4 that the mechanical advantage of the prior art single wheel, wheel barrow cannot be improved as herein above described because of the clearance C required between the wheel and the bucket. However, when converting the single wheel prior art wheel barrow, as shown in FIG. 4, to my improved dual wheel, wheel barrow axle 15 may be readily moved rearward because the over all configuration of the bucket 11 which accommodates rearward translation of wheels 21L and 21R.

Modifications, changes and improvements to the forms of the invention herein disclosed, described and illustrated may occur to those skilled in the art who come to understand the principles and precepts thereof. Accordingly, the scope of the patent to be issued hereon should not be limited to the particular embodiments of the invention set forth herein, but rather should be limited by the advance by which the invention has promoted the art.

I claim:

1. A method of converting a single wheel, wheel barrow to a dual wheel, wheel barrow wherein said single wheel, wheel barrow comprises a supporting structure having at least two planer diverging longerons, a cargo carrying bucket attached to and supported upon said supporting structure such that said longerons extend longitudinally fore and aft of said bucket diverging from front to rear, said single wheel, wheel barrow having axle attachment means attached to each of said longerons for securing an axle shaft thereto, each axle attachment means including a bracket having forward and rearward flanges extending forwardly and rearwardly of said axle shaft, said flanges having apertures extending therethrough and forward and rearward fastener means extending through said forward and rearward apertures respectively and an associated longeron for securing said bracket to said longeron, said axle shaft being secured transversely between said longerons with a single wheel mounted thereon, comprising the steps of:
(a) removing said single wheel and the associated axle shaft,
(b) removing the forward fastener means from each of said forward bracket flanges,
(c) rotating each said bracket 180 degrees about said rear fastener means to a new position with said forward flange being relocated rearwardly of said rearward flange,
(d) providing means for reattaching the forward flange of each of said brackets to the associated longeron in the new position,
(e) providing an extended axle shaft affixed to said repositioned brackets such that said axle shaft extends transversely between said longerons, said axle shaft having portions which protrude beyond said longerons thereby forming stub axles and,
(f) rotatingly affixing a wheel to each of said stub axles.

* * * * *